United States Patent
Lee et al.

(10) Patent No.: US 10,261,642 B2
(45) Date of Patent: Apr. 16, 2019

(54) FILM TOUCH SENSOR WITH AN INORGANIC PASSIVATION LAYER

(71) Applicant: Dongwoo Fine-Chem Co., Ltd., Jeollabuk-do (KR)

(72) Inventors: Jae-Hyun Lee, Gyeonggi-do (KR); Gi-Hwan Ahn, Chungcheongnam-do (KR); Jin-Koo Lee, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 15/378,901

(22) Filed: Dec. 14, 2016

(65) Prior Publication Data
US 2017/0177148 A1    Jun. 22, 2017

(30) Foreign Application Priority Data
Dec. 18, 2015    (KR) .................. 10-2015-0181795

(51) Int. Cl.
*G06F 3/044*    (2006.01)

(52) U.S. Cl.
CPC .... *G06F 3/044* (2013.01); *G06F 2203/04102* (2013.01); *G06F 2203/04103* (2013.01); *G06F 2203/04111* (2013.01)

(58) Field of Classification Search
CPC .. G06F 3/044; G06F 3/04102; G06F 3/04103; G06F 3/04111
See application file for complete search history.

(56) References Cited

U.S. PATENT DOCUMENTS

| | | | |
|---|---|---|---|
| 2015/0221688 A1* | 8/2015 | Xu | H01L 27/14692 257/292 |
| 2015/0331530 A1* | 11/2015 | Kim | G06F 3/0412 345/174 |
| 2016/0062518 A1* | 3/2016 | Ding | G06F 3/044 345/174 |

FOREIGN PATENT DOCUMENTS

KR    10-1191865 B1    10/2012

* cited by examiner

*Primary Examiner* — Laurence J Lee
(74) *Attorney, Agent, or Firm* — Venable LLP; Henry J. Daley

(57) ABSTRACT

Disclosed is a touch sensor, including a separation layer, an electrode pattern part formed on the separation layer and including at least one electrode pattern and an insulating layer, and a passivation layer formed of an inorganic material on the electrode pattern part, wherein the passivation layer has a thickness selected from among a thickness ranging from 50 nm to 120 nm, a thickness ranging from 220 nm to 290 nm, and a thickness ranging from 360 nm to 420 nm.

16 Claims, 6 Drawing Sheets

FILM TOUCH SENSOR WITH AN INORGANIC PASSIVATION LAYER

CROSS REFERENCE TO RELATED APPLICATION

This application claims the benefit of Korean Patent Application No. KR 10-2015-0181795, filed Dec. 18, 2015, which is hereby incorporated by reference in its entirety into this application.

BACKGROUND OF THE INVENTION

1. Technical Field

The present invention relates to a film touch sensor and, more particularly, to a film touch sensor that may meet requirements for both a transmittance and a color value (b*).

2. Description of the Related Art

As a touch input method is receiving attention as a next-generation input technique, many attempts are being made to apply such a touch input method to various kinds of electronics. Hence, thorough research and development is ongoing into touch sensors that are able to function under a variety of conditions and that also enable accurate touch recognition.

For example, in the case of electronics having touch-type displays, ultrathin flexible displays, which are lightweight and have low power consumption and improved portability, are receiving attention as next-generation displays, and thus, the development of touch sensors suitable for use in such displays is required. Briefly, there is the demand for a touch sensor having high bendability, restoring force, flexibility, and stretchability.

A film touch sensor for manufacturing a flexible display is exemplified by a wire board configured such that a line is embedded in a transparent resin base. Such a board is manufactured through a line formation process for forming a metal line on a substrate, a stacking process for applying and drying a transparent resin solution to form a transparent resin base so as to cover the metal line, and a stripping process for stripping the transparent resin base from the substrate.

In order to efficiently perform the stripping process in the aforementioned manufacturing method, an organic stripping material, such as a silicone resin or fluorine resin, or an inorganic stripping material, such as a diamond-like carbon (DLC) thin-film or a zirconium oxide thin-film, may be formed in advance on the surface of the substrate.

However, in the case where the inorganic stripping material is used, when the base and the metal line are stripped from the substrate, the line and the base are not efficiently stripped, and a portion thereof may thus be left behind on the surface of the substrate. Also, the organic material used as the stripping material may become stuck to the surface of the base and the line.

With the goal of solving such problems, Korean Patent No. 10-1191865 discloses a method of manufacturing a flexible substrate, including forming a sacrificial layer able to be removed using light or a solvent, a metal line and a polymer material (a flexible substrate) on a substrate, and removing the sacrificial layer, thereby stripping the metal line and the polymer material (the flexible substrate) from the substrate. However, it is difficult to remove the sacrificial layer on a large scale, and high-temperature processing cannot be performed, making it impossible to use various kinds of film bases.

As for the film touch sensor, which essentially includes the insulating layer, the transparent conductive layer and the passivation layer, it is difficult to meet requirements for both a transmittance and a color value (b*) when these layers are present. Hence, these problems are in need of being solved.

CITATION LIST

Patent Literature (Patent Document 1) Korean Patent No. 10-1191865

SUMMARY OF THE INVENTION

Accordingly, the present invention has been made keeping in mind the problems encountered in the related art, and the present invention is intended to provide a film touch sensor, which includes an insulating layer, a transparent conductive layer, and a passivation layer and may meet requirements for both a transmittance and a color value (b*).

In addition, the present invention is intended to provide a film touch sensor, which includes a layer that may be applied on a carrier substrate and may be used as a line-coating layer after separation from the carrier substrate.

In addition, the present invention is intended to provide a film touch sensor that includes a protective layer having a controlled elastic modulus, thus minimizing cracking due to the different stress relief capabilities of individual layers.

The aspects of the present invention are not limited to the foregoing, and other aspects not mentioned herein will be able to be clearly understood by those skilled in the art from the following description.

The present invention provides a film touch sensor, comprising: a separation layer, an electrode pattern part formed on the separation layer and including at least one electrode pattern and an insulating layer, and a passivation layer formed on the electrode pattern part using an inorganic material, wherein the passivation layer has a thickness selected from among a thickness ranging from 50 nm to 120 nm, a thickness ranging from 220 nm to 290 nm, and a thickness ranging from 360 nm to 420 nm.

The inorganic material may be $SiO_2$.

The film touch sensor may further comprise a protective layer formed between the separation layer and the electrode pattern part.

The electrode pattern may include a first transparent electrode and a second transparent electrode, and the transparent electrodes may be insulated from each other by means of the insulating layer.

The electrode pattern may include a first transparent electrode, a second transparent electrode and a bridge electrode, and the transparent electrodes may be insulated from each other by means of the insulating layer.

In the electrode pattern part, the insulating layer may function to insulate the first transparent electrode and the second transparent electrode or to form a bridge.

The insulating layer may be an organic insulating layer.

The electrode pattern may be formed of at least one material selected from among a metal, a metal nanowire, a metal oxide, carbon nanotubes, graphene, a conductive polymer, and conductive ink.

The metal oxide may be selected from the group consisting of indium tin oxide (ITO), indium zinc oxide (IZO), indium zinc tin oxide (IZTO), aluminum zinc oxide (AZO), gallium zinc oxide (GZO), fluorine tin oxide (FTO), zinc oxide (ZnO), indium tin oxide-silver-indium tin oxide (ITO-Ag-ITO), indium zinc oxide-silver-indium zinc oxide (IZO- Ag-IZO), indium zinc tin oxide-silver-indium zinc tin oxide (IZTO-Ag-IZTO), and aluminum zinc oxide-silver-aluminum zinc oxide (AZO-Ag-AZO).

The film touch sensor may further comprise a base film formed on the passivation layer.

The film touch sensor may further comprise an adhesive layer formed between the passivation layer and the base film.

The base film may be any one selected from among a polarizer plate, an isotropic film, a phase-difference film, and a protective film.

The separation layer may be provided in a manner such that it is formed on a carrier substrate and is then separated from the carrier substrate.

The carrier substrate may be a glass substrate.

The separation layer may be an organic polymer layer, and the organic polymer layer may include at least one material selected from the group consisting of polyimide, polyvinyl alcohol, polyamic acid, polyamide, polyethylene, polystyrene, polynorbornene, a phenylmaleimide copolymer, polyazobenzene, polyphenylenephthalamide, polyester, polymethyl methacrylate, polyarylate, a cinnamate-based polymer, a coumarin-based polymer, a phthalimidine-based polymer, a chalcone-based polymer, and an aromatic acetylene-based polymer.

The separation layer may have a thickness ranging from 10 to 1000 nm, and preferably from 50 to 500 nm.

According to the present invention, the film touch sensor includes an electrode pattern part including an insulating layer and a transparent conductive layer, and a passivation layer, wherein the passivation layer is formed of an inorganic material and has a specific thickness, thereby meeting requirements for both a transmittance and a color value (b*).

In addition, the film touch sensor includes a separation layer that can be applied on a carrier substrate and can be used as a line-coating layer even after separation from the carrier substrate, thus obviating the need to remove the separation layer. The film touch sensor can thus be very efficiently manufactured.

Since the process for manufacturing the touch sensor is performed on the carrier substrate, fine pitch and heat resistance can be ensured, and any kind of film base can be utilized.

Also, curling of the film touch sensor can be suppressed after separation from the carrier substrate.

In addition, when a protective layer having a controlled elastic modulus is formed, cracking due to the different stress relief capabilities of individual layers can be minimized, thereby providing a film touch sensor having superior quality.

DESCRIPTION OF THE SPECIFIC EMBODIMENTS

Hereinafter, a detailed description will be given of a film touch sensor and a method of manufacturing the same according to preferred embodiments of the present invention.

The features and advantages of the film touch sensor and the method of manufacturing the same according to the present invention will become more apparent through the following description.

In the present invention, a separation layer is formed on a carrier substrate, and a touch sensor formation process is implemented, after which the separation layer is separated from the carrier substrate and may thus be used as a line-coating layer, thereby ensuring heat resistance and a fine pitch, which are impossible to realize in the process of directly forming a touch sensor on the film base, and enabling the use of any kind of film base.

Figure 1:
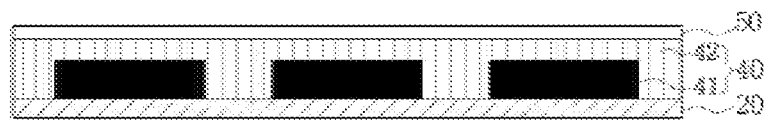
FIGS. 1 to 6 are cross-sectional views showing the film touch sensor configurations according to embodiments of the present invention.

According to an embodiment of the present invention, a film touch sensor may be configured to include, as shown in FIG. 1, a separation layer 20, an electrode pattern part 40 formed on the separation layer and including at least one electrode pattern 41 and an insulating layer 42, and a passivation layer 50 formed of an inorganic material on the electrode pattern part.

The passivation layer may have a thickness selected from among a thickness ranging from 50 nm to 120 nm, a thickness ranging from 220 nm to 290 nm, and a thickness ranging from 360 nm to 420 nm.

When the thickness of the passivation layer falls within the above range, the film touch sensor may satisfy requirements for a transmittance of 89% or more and b* of 3 or less.

In the present invention, the passivation layer is formed at an almost uniform thickness on the upper surface of the electrode pattern part thereunder.

The passivation layer composed of the inorganic material may be formed through any process known in the art. Such a process may include, for example, sputtering, such as CVD (Chemical Vapor Deposition), PVD (Physical Vapor Deposition), PECVD (Plasma-Enhanced Chemical Vapor Deposition) or the like, printing, such as screen printing, gravure printing, reverse offset printing, ink-jet printing or the like, or dry or wet plating.

The inorganic material may be preferably $SiO_2$.

The separation layer 20 is an organic polymer layer, and may be formed using at least one material selected from the group consisting of polyimide, polyvinyl alcohol, polyamic acid, polyamide, polyethylene, polystyrene, polynorbornene, a phenylmaleimide copolymer, polyazobenzene, polyphenylenephthalamide, polyester, polymethyl methacrylate, polyarylate, a cinnamate-based polymer, a coumarin-based polymer, a phthalimidine-based polymer, a chalcone-based polymer, and an aromatic acetylene-based polymer.

The separation layer 20 is applied on the carrier substrate 10, and the electrode pattern part is formed thereon, after which the separation layer is finally separated from the carrier substrate 10.

The peel strength of the separation layer 20 is preferably 1 N/25 mm or less, and more preferably 0.1 N/25 mm or less. The material for the separation layer 20 may be used without limitation so long as it is able to apply a physical force equal to or less than 1 N/25 mm, and particularly 0.1 N/25 mm, upon separation of the separation layer 20 from the carrier substrate 10.

If the peel strength of the separation layer 20 is greater than 1 N/25 mm, the separation layer is not completely separated from the carrier substrate, and thus the separation layer 20 is likely to be left behind on the carrier substrate. Furthermore, cracking may occur on at least one selected from among the separation layer 20, the protective layer 30, the electrode pattern part 40, and the passivation layer 50.

Particularly, it is preferably that the separation layer 20 has a peel strength of 0.1 N/25 mm or less. When the peel strength thereof is 0.1 N/25 mm or less, curling of the film after separation of the separation layer from the carrier substrate may be controlled. Although curling does not adversely affect the functions of the film touch sensor, processing efficiency in the bonding process or the cutting process may deteriorate. Hence, it is preferred that as little curling occur as possible.

The thickness of the separation layer 20 is preferably 10 to 1000 nm, and more preferably 50 to 500 nm. If the thickness of the separation layer 20 is less than 10 nm, the coating uniformity of the separation layer may decrease, and thus the resulting electrode pattern may become non-uniform, or the peel strength thereof may be somewhat increased, undesirably incurring tearing problems. Furthermore, curling may not be controlled on the film touch sensor after separation from the carrier substrate. On the other hand, if the thickness thereof exceeds 1000 nm, the peel strength is not further lowered, and film flexibility may decrease.

The separation layer may have a surface energy of 30 to 70 mN/m after having been stripped from the carrier substrate, and the difference in surface energy between the separation layer and the carrier substrate is preferably set to 10 mN/m or more. During the fabrication of a film touch sensor, the separation layer has to be stably adhered to the carrier substrate until it is stripped from the carrier substrate. Furthermore, the separation layer has to be easily stripped from the carrier substrate so as to prevent tearing or curling of the film touch sensor. When the surface energy of the separation layer falls within the range of 30 to 70 mN/m, it is possible to control peel strength, and adhesion of the separation layer to the protective layer or the electrode pattern part adjacent thereto is ensured, thus increasing processing efficiency. Also, when the difference in surface energy between the separation layer and the carrier substrate is 10 mN/m or more, the separation layer may be efficiently stripped from the carrier substrate, thus preventing the tearing of the film touch sensor or the cracking of individual layers of the film touch sensor.

Provided on the separation layer 20 is the electrode pattern part 40. The separation layer 20, which is separated from the carrier substrate, functions as a coating layer for covering the electrode pattern part 40, or functions as a protective layer for protecting the electrode pattern part 40 from external contact.

Figure 2:
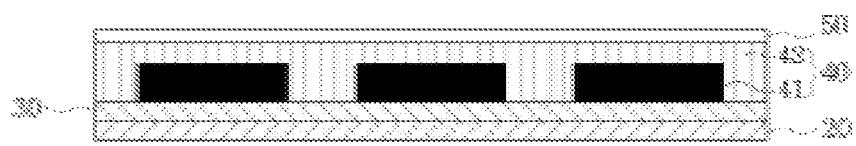

As shown in FIG. 2, at least one protective layer 30 may be further formed on the separation layer 20. Since it is difficult to protect the electrode pattern from external contact or impact using only the separation layer 20, at least one protective layer 30 may be formed on the separation layer 20.

The protective layer 30 may be formed of at least one selected from among an organic insulating layer and an inorganic insulating layer, using coating and curing processes or a deposition process. The organic insulating layer or the inorganic insulating layer may include those typically useful in the art. Also, the protective layer may be formed of a polyolefin resin.

The protective layer may be formed in the state in which a portion where a pad electrode is to be formed is removed in order to realize circuit connection, or may be formed on portions other than the portion where a pad electrode is to be formed. A pad pattern layer may be formed under the pad electrode, and the protective layer may be applied so as to cover the entire upper surface of the separation layer, and may then be patterned in order to form the pad pattern layer, or may be formed through a process of coating portions other than the portion where a pad pattern layer is to be formed.

Provided on the separation layer 20 or the protective layer 30 is the electrode pattern part 40.

The electrode pattern part 40 includes a sensing electrode (SE) for detecting a touch and a pad electrode (PE) formed at one end of the sensing electrode. The sensing electrode may include an electrode for detecting a touch and a line pattern connected thereto.

The pad pattern layer may be formed on or under the pad electrode. The pad electrode may be electrically connected to a circuit board via the pad pattern layer, and functions to decrease contact resistance upon connection to the circuit board. In the case where the circuit board is bonded in the direction of the passivation layer 50, the pad pattern layer is formed on the pad electrode, and in the case where the circuit board is bonded in the direction of the separation layer 20, the pad pattern layer may be formed under the pad electrode. When contact resistance is sufficiently low upon connection of the pad electrode to the circuit board, the pad pattern layer may be omitted.

The pad pattern layer may be formed of at least one material selected from among a metal, a metal nanowire, a metal oxide, carbon nanotubes, graphene, a conductive polymer, and conductive ink.

The electrode pattern 41 of the electrode pattern part 40 is a transparent conductive layer, and may be formed of at least one material selected from among a metal, a metal nanowire, a metal oxide, carbon nanotubes, graphene, a conductive polymer, and conductive ink.

Here, the metal may be any one selected from among gold (Au), silver (Ag), copper (Cu), molybdenum (Mo), aluminum, palladium, neodymium, and a silver-palladium-copper alloy (APC).

The metal nanowire may be any one selected from among a silver nanowire, a copper nanowire, a zirconium nanowire, and a gold nanowire.

The metal oxide may be any one selected from among indium tin oxide (ITO), indium zinc oxide (IZO), indium zinc tin oxide (IZTO), aluminum zinc oxide (AZO), gallium zinc oxide (GZO), fluorine tin oxide (FTO), zinc oxide (ZnO), indium tin oxide-silver-indium tin oxide (ITO-Ag-ITO), indium zinc oxide-silver-indium zinc oxide (IZO-Ag-IZO), indium zinc tin oxide-silver-indium zinc tin oxide (IZTO-Ag-IZTO), and aluminum zinc oxide-silver-aluminum zinc oxide (AZO-Ag-AZO).

The electrode pattern 41 may be formed of a carbon-based material including carbon nanotubes (CNTs) or graphene.

The conductive polymer includes polypyrrole, polythiophene, polyacetylene, PEDOT and polyaniline, and may be used to form electrodes.

The conductive ink is a mixture comprising a metal powder and a curable polymer binder, and may be used to form electrodes.

Figure 3:
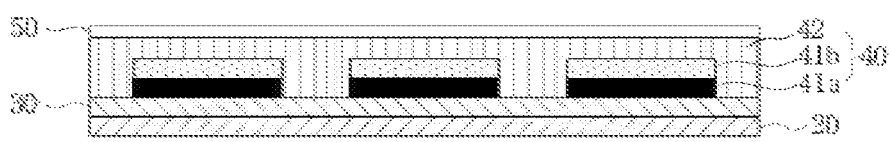

In some cases, the electrode pattern 41 may be configured to include two or more conductive layers in order to reduce electrical resistance, as shown in FIG. 3.

In an exemplary embodiment, the electrode pattern 41 may be provided in the form of a monolayer using ITO, AgNW (silver nanowire), or metal mesh. When two or more layers are provided, the first electrode layer may be formed of a transparent metal oxide such as ITO, and the second electrode layer may be formed on the ITO electrode layer using a metal or AgNW to further decrease electrical resistance.

The electrode pattern 41 may include at least one electrode layer composed of a metal or metal oxide to increase electrical conductivity. More specifically, the electrode pattern may be configured such that a transparent conductive layer is formed using a metal or metal oxide on the separation layer or the protective layer, after which an additional transparent conductive layer is formed, or such that at least one transparent conductive layer is formed on the separation layer or the protective layer, after which an additional transparent conductive layer is formed using a metal or metal oxide. Specific examples of the stacking structure of the electrode pattern may include a structure configured such that a metal or metal oxide pattern layer is further formed between the separation layer and the electrode pattern layer, a structure configured such that a metal or metal oxide pattern layer is further formed between the electrode pattern layer and the insulating layer, and a structure configured such that a metal or metal oxide pattern layer is further formed between the protective layer and the electrode pattern layer. Also, at least one electrode pattern layer composed of a transparent conductive material may be further included.

Specific examples of the stacking structure of the electrode pattern 41 that are useful are described below.

As examples thereof, there are a structure configured such that a metal oxide is layered and a silver nanowire is layered thereon, a structure configured such that a metal oxide is layered and a metal is layered thereon, a structure configured such that a metal oxide is layered and a metal mesh electrode is formed thereon, a structure configured such that a silver nanowire is layered and a metal oxide is layered thereon, a structure configured such that a metal is layered and a metal oxide is layered thereon, a structure configured such that a metal mesh electrode is formed and a metal oxide is layered thereon, a structure configured such that a metal oxide is layered, a silver nanowire is layered thereon and a metal layer is further formed thereon, and a structure configured such that a silver nanowire is layered, a metal oxide is layered thereon and a metal layer is further formed thereon. The electrode stacking structure may vary taking into consideration the signal processing of the touch sensor and the resistance thereof, and the present invention is not limited thereto.

The electrode pattern 41 may be configured such that an electrical insulating layer is formed between the first electrode pattern and the second electrode pattern, or such that the electrical insulating layer is patterned to form contact holes and the second conductive layer is formed so as to function as a bridge electrode.

The structure of the electrode pattern 41 is described below in terms of mode of touch sensor.

The electrode pattern preferably has a capacitance-type electrode pattern structure, for example, a mutual-capacitance type or a self-capacitance type.

In the case of the mutual-capacitance type, there may be provided a lattice electrode structure having a horizontal axis (a first transparent electrode) and a vertical axis (a second transparent electrode). The bridge electrode may be provided at the intersection of the horizontal axis and the vertical axis, or the electrode pattern layer at the horizontal axis and the electrode pattern layer at the vertical axis may be individually formed and electrically isolated from each other.

In the case of the self-capacitance type, there may be provided the electrode layer structure that records changes in capacitance using one electrode at each position.

Figure 4A:
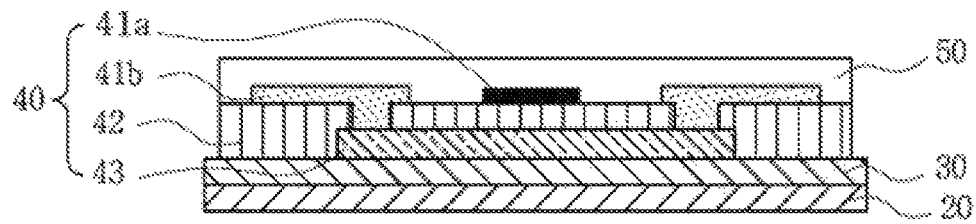
Figure 4B:
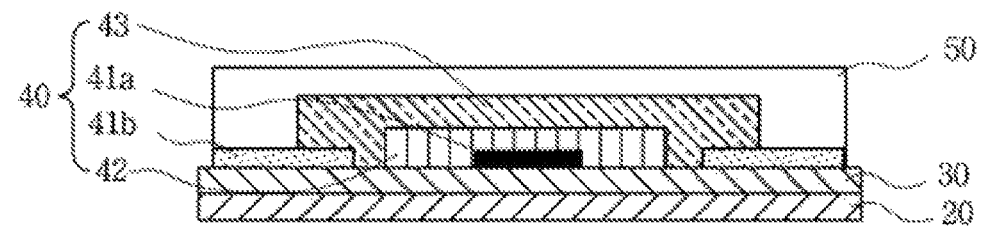
Figure 4C:
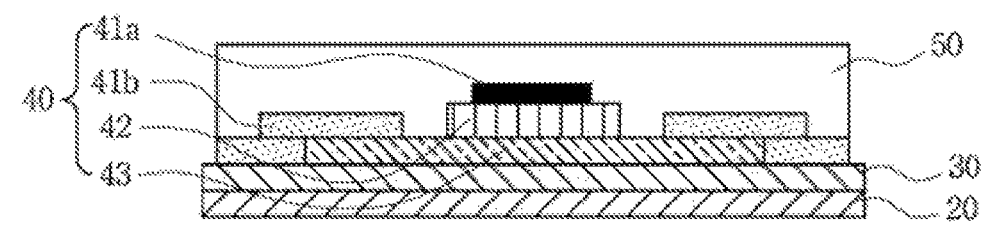

In the present invention, the electrode pattern part 40 may be configured to include at least one electrode pattern and an insulating layer, to include a first transparent electrode, a second transparent electrode, and an insulating layer, or to include, as shown in FIGS. 4A to 4C, a first transparent electrode 41a, a second transparent electrode 41b, a bridge electrode 43, and an insulating layer 42. FIG. 4A illustrates a contact hole-type electrode pattern part 40, and FIGS. 4B and 4C illustrate insulating layer-island-type electrode pattern parts 40.

The configuration of the electrode pattern part 40 of the film touch sensor according to the present invention is not particularly limited, and may include known structures in which an electrode pattern and an insulating layer, or an electrode pattern, an insulating layer and a bridge, are variously disposed, in order to form a touch sensor. In particular, a specific electrode pattern part 40 may be formed in a manner in which processes of forming an insulating layer, patterning the insulating layer, forming a transparent conductive layer, patterning the transparent conductive layer, and forming a bridge are variously conducted depending on the configuration thereof. Thus, the scope of the present invention is not limited to an electrode pattern part 40 having a specific configuration.

On the uppermost portion of the electrode pattern part 40 according to the present invention, an insulating layer is further formed, and a passivation layer 50 may also be formed thereon. However, taking into consideration increases in cost and in the number of processes, the passivation layer 50 is typically formed as described above.

The insulating layer may have a function to prevent corrosion of the electrode pattern and to protect the surface of the electrode pattern. The insulating layer is preferably formed to a predetermined thickness while filling gaps in the electrodes or lines. Also, it may be formed flat so as not to expose uneven parts of the electrodes on the electrode pattern part 40.

The insulating layer may cover only the sensing electrode, so that the pad electrode is not covered but is exposed outside, in order to provide a space required to connect the pad electrode or the pad pattern layer to the circuit board.

The difference in elastic modulus at 25° C. between the protective layer 30 and the insulating layer is preferably 300 MPa or less in order to inhibit cracking due to the different stress relief capabilities of individual layers. The reason why the difference in elastic modulus between the protective layer 30 and the insulating layer is preferably 300 MPa or less at 25° C. is as follows. If the difference in elastic modulus between the protective layer and the insulating layer exceeds 300 MPa, strain energy and stress relief capability between the two layers may be unbalanced, undesirably causing cracking.

The reason why the difference in elastic modulus at 25° C. is measured is that cracking must be prevented in environment used by users.

The material for the insulating layer is not particularly limited so long as it is an organic insulating material that has an elastic modulus that is different from that of the protective layer by 300 Mpa or less, and the insulating layer is preferably formed of a thermosetting or UV-curable organic polymer. The insulating layer may be formed using at least one material selected from among an epoxy compound, an acrylic compound, and a melamine compound.

The insulating layer may be formed using at least one material selected from among a curable prepolymer, a curable polymer and a plastic polymer, depending on the type of material. Useful is any material that is typically used in the art.

The insulating layer itself may function as a base film. In this case, it is preferably formed of a varnish-type material that may be formed into a film, and the varnish-type material may include at least one selected from among polysilicone, including polysiloxane such as polydimethylsiloxane (PDMS) and polyorganosiloxane (POS), polyimide, and polyurethane, such as spandex.

The film touch sensor of the present invention may be configured such that the pad electrode may be electrically connected to the circuit board.

The circuit board may be exemplified by a flexible printed circuit board (FPCB), and plays a role in electrically connecting a touch control circuit and the film touch sensor of the present invention to each other.

One end of the circuit board may be provided with an electrode corresponding to the pad electrode, and the pad electrode and the circuit board may be electrically connected to each other by a conductive adhesive. The film touch sensor may be connected to the circuit board via the upper opening in the pad electrode, or may be connected to the circuit board via the separation layer. The pad pattern layer may be formed using a material having low resistance on or under the pad electrode. In this case, the circuit board may be connected to the pad electrode via the pad pattern layer.

Figure 5:
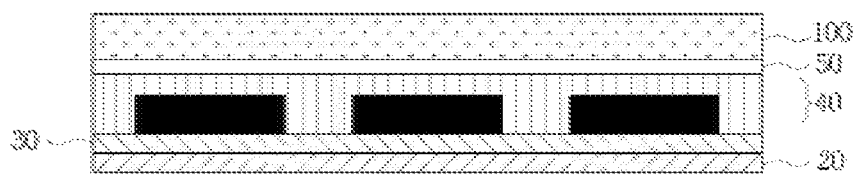

According to another embodiment of the present invention, a film touch sensor may be configured to include, as shown in FIG. 5, a separation layer 20, an electrode pattern part 40 formed on the separation layer, a passivation layer 50 formed on the electrode pattern part, and a base film 100 formed on the passivation layer.

Here, the base film 100 may be a transparent film or a polarizer plate.

The transparent film may be a film having high transparency, mechanical strength and thermal stability, and specific examples thereof may include films made of thermoplastic resin, including a polyester resin such as polyethylene terephthalate, polyethylene isophthalate, polyethylene naphthalate, or polybutylene terephthalate; a cellulose resin such as diacetyl cellulose or triacetyl cellulose; a polycarbonate resin; an acrylic resin such as polymethyl (meth)acrylate or polyethyl (meth)acrylate; a styrene resin such as polystyrene or an acrylonitrile-styrene copolymer; a polyolefin resin such as polyethylene, polypropylene, polyolefin having a cyclic or norbornene structure, or an ethylene-propylene copolymer; a vinyl chloride resin; an amide resin such as nylon or aromatic polyamide; an imide resin; a polyethersulfone resin; a sulfone resin; a polyetheretherketone resin; a polyphenylene sulfide resin; a vinyl alcohol resin; a vinylidene chloride resin; a vinyl butyral resin; an arylate resin; a polyoxymethylene resin; an epoxy resin; or a film composed of a blend of the thermoplastic resins. Also, a film which is made of a thermosetting resin such as (meth)acryl, urethane, acrylurethane, epoxy or silicone or UV-curable resin may be useful. The thickness of the transparent film may be appropriately determined, and is typically about 1 to 500 μm in order to achieve workability such as strength or easiness to handle, and the ability to form a thin film. Preferably, the thickness thereof is 1 to 300 μm, and more preferably 5 to 200 μm.

The transparent film may contain at least one suitable additive. Examples of the additive may include a UV absorbent, an antioxidant, a lubricant, a plasticizer, a release agent, a coloring inhibitor, a flame retardant, a nucleation agent, an antistatic agent, a pigment, and a coloring agent. The transparent film may be configured to include various functional layers such as a hard coating layer, an antireflective layer, and a gas barrier layer on one or both surfaces of the film, but the kind of functional layer is not limited thereto, and may be variously provided depending on the end use thereof.

As necessary, the transparent film may be subjected to surface treatment. Examples of the surface treatment process may include dry treatment such as plasma treatment, corona treatment or primer treatment, and chemical treatment such as alkali treatment, including saponification.

Also, the transparent film may be an isotropic film, a phase-difference film, or a protective film.

In the case of isotropic film, an in-plane phase difference (Ro, wherein Ro=[(nx−ny)×d], in which nx and ny are main refractive indices in the plane of the film, and d is the film thickness) is 40 nm or less, and preferably 15 nm or less, and a phase difference in a thickness direction (Rth, wherein Rth=[(nx+ny)/2−nz]×d, in which nx and ny are main refractive indices in the plane of the film, nz is the refractive index of the film in a thickness direction, and d is the film thickness) falls in the range of −90 nm to +75 nm, preferably −80 nm to +60 nm, and more preferably −70 nm to +45 nm.

The phase-difference film may be manufactured by subjecting a polymer film to uniaxial drawing, biaxial drawing, polymer coating, or liquid crystal coating, and is typically used to improve and control the optical properties of displays, including viewing angle compensation, color quality, light leakage and color.

Examples of the phase-difference film may include a ½ or ¼ wavelength plate, a positive C-plate, a negative C-plate, a positive A-plate, a negative A-plate, and a biaxial wavelength plate.

The protective film may be a film including an adhesive layer on at least one surface of a film composed of a polymer resin, or may be a film having self-adhesion such as polypropylene, and may be used to protect the surface of the touch sensor and to improve processability.

The polarizer plate may include those known in the fields of display panels.

Specifically, the polarizer plate may include, but is not limited to, those obtained by drawing a polyvinyl alcohol film and applying it on at least one surface of a polarizer stained with iodine or a dichroic dye to form a protective layer, by aligning liquid crystals to impart the performance of the polarizer, or by coating a transparent film with an orientation resin such as polyvinyl alcohol and then performing drawing and staining.

Figure 6:
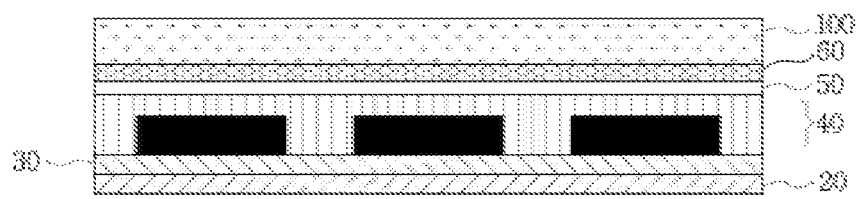

According to still another embodiment of the present invention, a film touch sensor may be configured to include, as shown in FIG. 6, a separation layer 20, an electrode pattern part 40 formed on the separation layer, a passivation layer 50 formed on the electrode pattern part, an adhesive layer 60 formed on the passivation layer, and a base film 100 formed on the adhesive layer.

The adhesive layer 60 may be formed using an adhesive or glue, which is of either a thermosetting or a UV-curable type.

The adhesive or glue used for the bonding of the base film 100 preferably includes polyester, polyether, polyurethane, epoxy, silicone, and an acrylic material.

The process of manufacturing the film touch sensor having the above structure according to the present invention is described below with reference to FIGS. 7A to 7F.

FIGS. 7A to 7F are cross-sectional views showing a process of manufacturing a film touch sensor according to a first embodiment of the present invention. With reference thereto, the method of manufacturing the film touch sensor according to the first embodiment of the present invention is specified below.

Figure 7A:
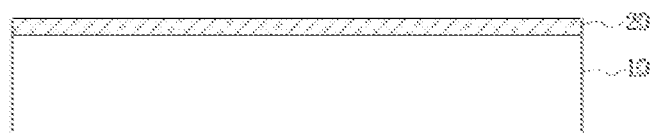
FIGS. 7A to 7F are cross-sectional views showing a process of manufacturing a film touch sensor according to a first embodiment of the present invention.

As shown in FIG. 7A, an organic polymer layer is applied on a carrier substrate 10, thus forming a separation layer 20.

The separation layer may be applied using a known coating process.

Examples of the coating process may include spin coating, die coating, spray coating, roll coating, screen coating, slit coating, dip coating, and gravure coating.

The curing process for forming the separation layer 20 may include either thermosetting or UV curing, or a combination of thermosetting and UV curing.

The carrier substrate 10 is preferably exemplified by a glass substrate, but the present invention is not limited to the glass substrate, but any other substrate may also be used as the carrier substrate 10. Here, any material may be used therefor, so long as it is not deformed at high temperatures so as to be able to endure the processing temperatures upon formation of the electrode, that is, has heat resistance suitable for maintaining flatness.

Figure 7B:
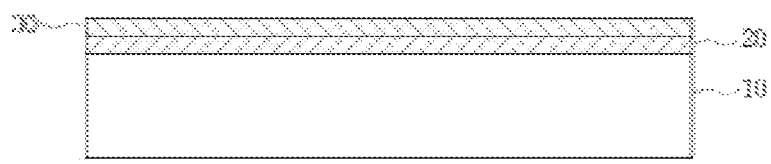

Next, as shown in FIG. 7B, an organic insulating layer is formed on the separation layer 20 on the carrier substrate 10, whereby a protective layer 30 is formed. As such, the formation of the protective layer 30 may be omitted.

The protective layer 30 may be removed through a patterning process in order to form a pad pattern layer for circuit connection, or may be applied on portions other than the portion where the pad pattern layer is to be formed. On the portion where the protective layer is not formed, the pad pattern layer may be formed in order to realize connection to the circuit board. In the present embodiment, the case where the pad pattern layer is not provided is described.

Next, an electrode pattern part 40 is formed on the protective layer 30. In the present embodiment, an electrode pattern part having a monolayer stacking structure is described.

Figure 7C:
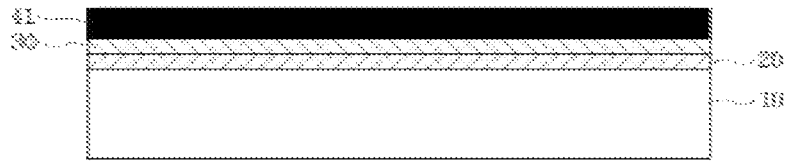
Figure 7D:
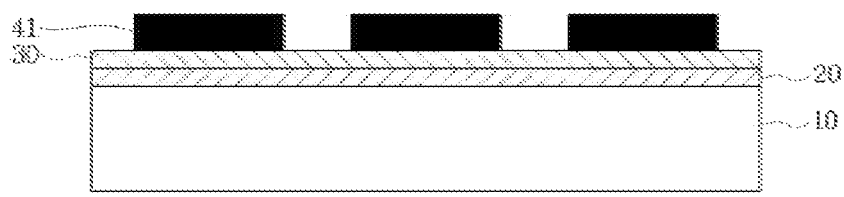

As shown in FIG. 7C, as the transparent conductive layer, an ITO transparent electrode layer is formed, and a photosensitive resist (not shown) is formed thereon. Thereafter, selective patterning is performed through photolithography, thus forming an electrode pattern 41 as shown in FIG. 7D.

The transparent conductive layer may be formed using a sputtering process such as CVD (Chemical Vapor Deposition), PVD (Physical Vapor Deposition) or PECVD (Plasma-Enhanced Chemical Vapor Deposition), a printing process such as screen printing, gravure printing, reverse offset printing or ink-jet printing, or a dry or wet plating process. When the conductive layer is formed using a sputtering process, a mask having a desired electrode pattern shape is disposed on the substrate, and a sputtering process is performed, thus forming an electrode pattern part. Alternatively, the conductive layer may be formed on the entire surface of the substrate using the above process, after which the electrode pattern may be formed through photolithography.

The photosensitive resist may be a negative-type photosensitive resist or a positive-type photosensitive resist. After the patterning process, the photosensitive resist may be left behind on the electrode pattern part 40, or may be removed, as necessary. In the present embodiment, a positive-type photosensitive resist is used, and is removed from the electrode pattern after the patterning process.

Figure 7E:
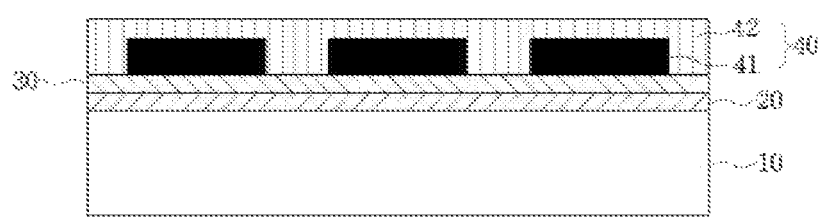

Next, as shown in FIG. 7E, an insulating layer 42 is formed so as to cover the electrode pattern part 40. The insulating layer 42 is formed to a thickness equal to or greater than the thickness of the electrode so that the upper surface of the insulating layer becomes flat. To this end, an insulating material having appropriate viscoelastic properties has to be used so that the uneven parts of electrodes are not transferred.

Here, applying the insulating layer may be performed using any known coating process.

Examples of the coating process may include spin coating, die coating, spray coating, roll coating, screen coating, slit coating, dip coating, and gravure coating.

The coating of the insulating layer may be performed through at least one process selected from among thermosetting, UV curing, thermal drying, and vacuum drying, depending on the properties of the material for the insulating layer.

The insulating layer itself may function as a support. In this case, since the insulating layer is responsible for the function of the base film, there is no need to attach an additional base film. When the upper surface of the insulating layer is not flat, it cannot function as the base film due to the uneven parts thereof. Also, when an additional base film is attached to the upper surface of the insulating layer that is not flat, uniform bonding is impossible, and the performance of the touch sensor may deteriorate.

The insulating layer 42 may be formed so as to cover only the sensing electrode, so that the pad electrode is not covered but is exposed outside, in order to provide the space required to connect the pad electrode or the pad pattern layer to the circuit board.

The process of forming the insulating layer 42 so as to expose the pad electrode may be performed in a manner in which the insulating layer is applied so as to cover the entire upper surface of the electrode pattern part and is then patterned, or in which the insulating layer is applied on portions other than the portion of the pad electrode so as to expose the pad electrode.

After the formation of the insulating layer, the pad pattern layer may be formed. In the present embodiment, a structure having no pad pattern layer is described.

Figure 7F:
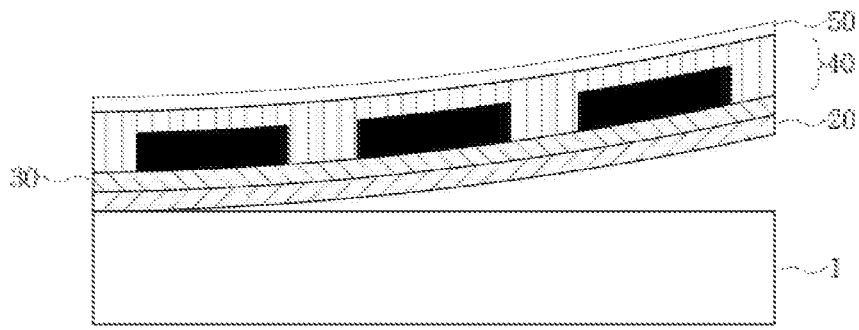

Next, as shown in FIG. 7F, the separation layer 20 having the electrodes is separated from the carrier substrate 10, which is used to perform the process of manufacturing the touch sensor.

In the present invention, the separation layer 20 is separated from the carrier substrate 10 using a stripping process.

The stripping process may include lift-off or peel-off, but the present invention is not limited thereto.

Next, the film touch sensor may be bonded to the circuit board. Here, the bonding to the circuit board may be achieved using a conductive adhesive.

The conductive adhesive is configured such that a conductive filler such as silver, copper, nickel, carbon, aluminum, or a plating is dispersed in a binder such as epoxy, silicone, urethane, acryl, or a polyimide resin.

The circuit board may be bonded before or after separation of the touch sensor from the carrier substrate.

In the case where the circuit board is bonded before separation from the carrier substrate, the stacking structure may be formed so as to expose a portion of the pad electrode in at least one step selected from among applying the insulating layer, forming the insulating layer coating, and attaching the base film, or the stacking structure may be formed so as to expose a portion of the pad electrode through an additional patterning process. The circuit board is bonded to the exposed pad electrode, and is then separated from the carrier substrate. When the pad pattern layer is formed on the pad electrode, the circuit board is bonded to the pad pattern layer, after which the carrier substrate is separated.

In the case where the circuit board is bonded after separation from the carrier substrate, the circuit board may be bonded to the pad electrode through the separation layer in the direction of the separation layer, and the pad pattern layer may be formed under the pad electrode. In this case, the circuit board is connected to the pad electrode via the pad pattern layer. The circuit board may be bonded to the pad electrode or the pad pattern layer, which is exposed in the direction of the insulating layer or the base film.

The connection of the circuit board to the pad electrode via the pad pattern layer is performed to decrease the contact resistance between the circuit board and the pad electrode, and may be selectively applied depending on the manufacturing process and the product specifications.

Figure 8A:
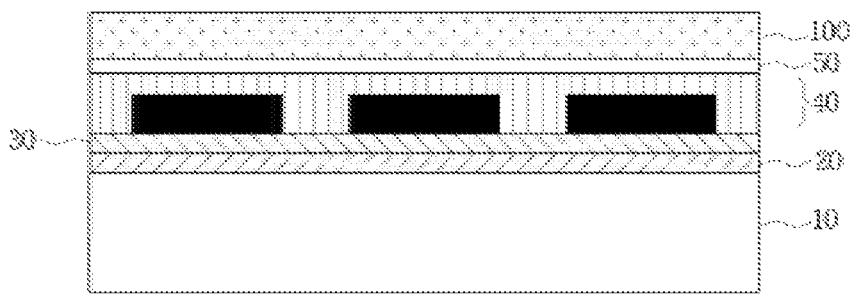
FIGS. 8A and 8B are cross-sectional views showing a process of manufacturing a film touch sensor according to a second embodiment of the present invention.
Figure 8B:
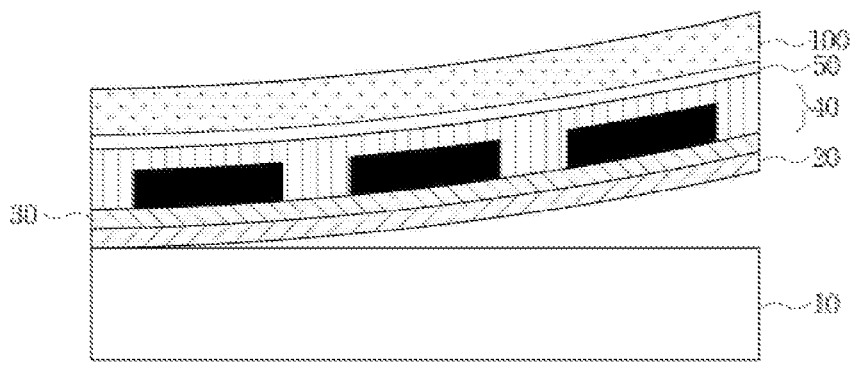

FIGS. 8A and 8B are cross-sectional views showing a process of manufacturing a film touch sensor according to a second embodiment of the present invention. With reference thereto, the method of manufacturing the film touch sensor according to the second embodiment of the present invention is described below.

The formation of the separation layer 20 on the carrier substrate 10, the formation of the protective layer 30, and the formation of the electrode pattern part 40 and the passivation layer 50 are substantially the same as in the first embodiment.

In the second embodiment of the present invention, a base film 100 may be attached to the upper surface of the passivation layer 50. In the case where the insulating layer has the function of the adhesive layer, as shown in FIG. 8A, the base film 100 may be directly bonded to the upper surface of the insulating layer.

In the course of bonding the base film, the pressure required to attach the base film to the insulating layer is 1 to 200 Kg/cm$^2$, and preferably 10 to 100 Kg/cm$^2$.

Next, as shown in FIG. 8B, the separation layer is separated from the carrier substrate 10 using a stripping process. Thereafter, the circuit board is bonded to the pad electrode or the pad pattern layer.

Figure 9A:
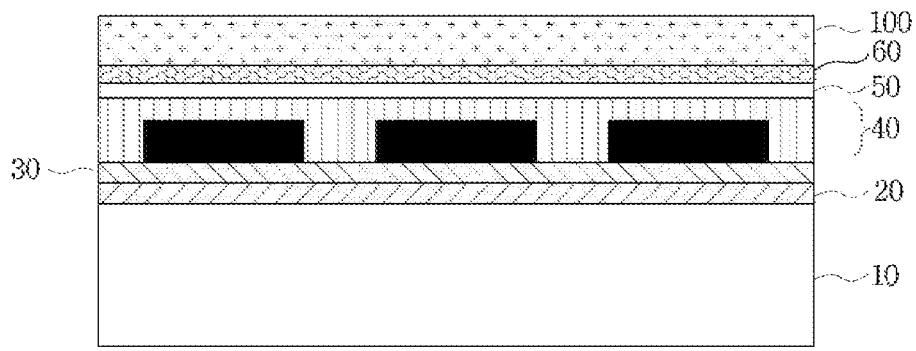
FIGS. 9A and 9B are cross-sectional views showing a process of manufacturing a film touch sensor according to a third embodiment of the present invention.
Figure 9B:
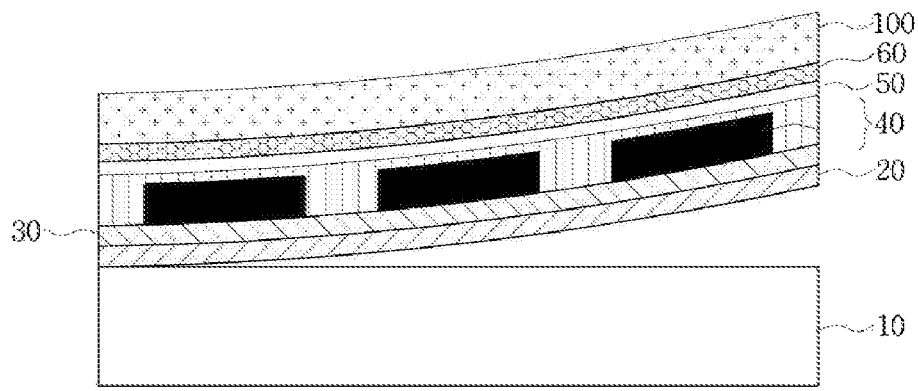

FIGS. 9A and 9B are cross-sectional views showing a process of manufacturing a film touch sensor according to a third embodiment of the present invention. With reference thereto, the method of manufacturing the film touch sensor according to the third embodiment of the present invention is described below.

In the third embodiment of the present invention, a passivation layer 50 is formed, and then an adhesive layer 60 is formed on the passivation layer 50 so that a base film 100 is attached thereto. In this case, the adhesive layer 60 is first formed on one surface of the base film 100, after which the base film may be attached thereto. Here, a NCF (Non Carrier Film)-type adhesive film or glue film may be used. Also, the upper surface of the insulating layer may be coated with the adhesive layer, after which the base film 100 may be attached thereto. Specifically, an OCR (Optically Clear Resin)-type liquid adhesive may be applied and the base film may be formed thereon, followed by curing.

FIG. 9A shows the stacking structure in which the adhesive layer is formed on the insulating layer and the base film is adhered thereto.

Next, as shown in FIG. 9B, the separation layer is separated from the carrier substrate 10 using a stripping process. Thereafter, the circuit board is bonded to the pad electrode or the pad pattern layer.

Although not described in embodiments of the present invention, the processing sequence for forming individual layers may be varied.

The film touch sensor manufactured according to the present invention may be bonded to the display panel such that the base film is positioned toward the visible side thereof, or may be disposed on the other side of the display panel. Also, the separation layer may be bonded to another optical film, for example, a polarizer plate, or a transparent film.

According to the present invention, the film touch sensor and the method of manufacturing the same enable the formation of a touch sensor on a carrier substrate, thus ensuring heat resistance and a fine pitch, which are impossible to realize in the process of directly forming a touch sensor on a film base, and any kind of film base may be used. That is, a base film having low heat resistance may be employed because it is bonded after the formation of electrodes.

The separation layer formed on the carrier substrate is not removed, and the circuit board may be attached to the pad pattern layer before or after separation from the carrier substrate, thus increasing processing efficiency.

Also, a protective layer having a controlled elastic modulus is further provided between the separation layer and the electrode pattern part, thus suppressing cracking due to different stress relief capabilities and preventing curling of the film touch sensor.

Examples 1 to 8 and Comparative Examples 1 to 6: Fabrication of Film Touch Sensor A film touch sensor of each of Examples 1 to 8 and Comparative Examples 1 to 6 was manufactured by sequentially layering the materials shown in Table 1 below on a glass substrate (thickness: 700 μm). The thicknesses of the ITO and passivation layer (SiO$_2$) in the Examples and Comparative Examples are shown in Tables 2 and 3 below.

TABLE 1

| Stacking sequence | Material | Refractive index | Thickness (nm) |
|---|---|---|---|
| SiO$_2$ | SiO$_2$ | 1.47 | 50 to 500 |
| ITO | ITO | 1.73 | 30 to 50 |
| Insulating layer | Siloxane resin | 1.56 | 1,200 |
| Protective layer | Polyolefin resin | 1.55 | 1,500 |
| Separation layer | Cinnamate resin | 1.55 | 265 |

Test Example 1: Measurement of Transmittance and Color Values Depending on Thickness of SiO$_2$ The transmittance and color values of the film touch sensors of Examples 1 to 8 and Comparative Examples 1 to 6 were measured as follows. The results are shown in Tables 2 and 3 below.

(1) Measurement of Transmittance (%) and Color Values b* and a* of Film Touch Sensor The transmittance (%) of film touch sensor and color values b* and a* were measured in a transmission mode using a Konica Minolta CM-3700d.

TABLE 2

| No. | Thickness of SiO₂ layer (nm) | Thickness of ITO layer (nm) | Transmittance (%) | b* (D65) | a* (D65) |
|---|---|---|---|---|---|
| Ex. 1-1 | 50 | 30 | 89.1 | 2.6 | −0.2 |
| Ex. 1-2 |  | 40 | 89.0 | 2.4 | −0.3 |
| Ex. 1-3 |  | 50 | 89.5 | 0.1 | 0.2 |
| Ex. 2-1 | 100 | 30 | 93.0 | 2.4 | −1.4 |
| Ex. 2-2 |  | 40 | 93.0 | 2.4 | −1.4 |
| Ex. 2-3 |  | 50 | 93.8 | 1.9 | −1.3 |
| Ex. 3-1 | 120 | 30 | 92.5 | 2.5 | −1.3 |
| Ex. 3-2 |  | 40 | 92.3 | 2.9 | −1.6 |
| Ex. 3-3 |  | 50 | 93.5 | 2.3 | −1.6 |
| Ex. 4-1 | 220 | 30 | 89.3 | 1.9 | 0.8 |
| Ex. 4-2 |  | 40 | 89.1 | 1.8 | 1.0 |
| Ex. 4-3 |  | 50 | 89.4 | 1.4 | 1.2 |
| Ex. 5-1 | 250 | 30 | 89.9 | 0.8 | −1.4 |
| Ex. 5-2 |  | 40 | 89.9 | 0.8 | −1.4 |
| Ex. 5-3 |  | 50 | 90.9 | −0.6 | −1.2 |
| Ex. 6-1 | 290 | 30 | 91.6 | 2.9 | −2.5 |
| Ex. 6-2 |  | 40 | 91.3 | 2.9 | −2.4 |
| Ex. 6-3 |  | 50 | 92.3 | 2.8 | −2.6 |
| Ex. 7-1 | 360 | 30 | 89.4 | 2.8 | 1.4 |
| Ex. 7-2 |  | 40 | 89.2 | 2.6 | 1.4 |
| Ex. 7-3 |  | 50 | 89.6 | 2.9 | 1.6 |
| Ex. 8-1 | 400 | 30 | 89.1 | 0.4 | 1.2 |
| Ex. 8-2 |  | 40 | 89.2 | 0.3 | 1.2 |
| Ex. 8-3 |  | 50 | 89.1 | −1.5 | 1.4 |

TABLE 3

| No. | Thickness of SiO₂ layer (nm) | Thickness of ITO layer (nm) | Transmittance (%) | b* (D65) | a* (D65) |
|---|---|---|---|---|---|
| C. Ex. 1-1 | 40 | 30 | 87.1 | 2.4 | 0.2 |
| C. Ex. 1-2 |  | 40 | 88.2 | 2.5 | 0.4 |
| C. Ex. 1-3 |  | 50 | 88.1 | 1.2 | 0.5 |
| C. Ex. 2-1 | 150 | 30 | 90.9 | 6.3 | −1.3 |
| C. Ex. 2-2 |  | 40 | 90.5 | 7.4 | −1.3 |
| C. Ex. 2-3 |  | 50 | 91.0 | 6.2 | −0.5 |
| C. Ex. 3-1 | 200 | 30 | 88.1 | 2.6 | 0.8 |
| C. Ex. 3-2 |  | 40 | 87.3 | 2.2 | 1.3 |
| C. Ex. 3-3 |  | 50 | 87.8 | −0.6 | 2.2 |
| C. Ex. 4-1 | 300 | 30 | 91.8 | 6.8 | −3.1 |
| C. Ex. 4-2 |  | 40 | 91.8 | 8.1 | −3.5 |
| C. Ex. 4-3 |  | 50 | 93.0 | 7.3 | −3.1 |
| C. Ex. 5-1 | 350 | 30 | 89.6 | 4.3 | 1.0 |
| C. Ex. 5-2 |  | 40 | 89.0 | 4.2 | 1.8 |
| C. Ex. 5-3 |  | 50 | 89.5 | 1.7 | 3.2 |
| C. Ex. 6-1 | 450 | 30 | 90.1 | 5.4 | −3.7 |
| C. Ex. 6-2 |  | 40 | 90.0 | 5.8 | −4.6 |
| C. Ex. 6-3 |  | 50 | 91.1 | 5.6 | −4.8 |
| C. Ex. 7-1 | 500 | 30 | 90.5 | 5.5 | −1.3 |
| C. Ex. 7-2 |  | 40 | 90.3 | 5.8 | −1.0 |
| C. Ex. 7-3 |  | 50 | 91.2 | 3.7 | 0.2 |

As is apparent from Tables 2 and 3, when the thickness of the passivation layer (SiO₂) falls in the range of 50 nm to 120 nm, 220 nm to 290 nm, or 360 nm to 420 nm, a transmittance of 89% or more and b* of 3 or less are satisfied. If the thickness thereof falls out of the above ranges, desired transmittance and color values cannot be obtained.

Although the preferred embodiments of the present invention have been disclosed for illustrative purposes, those skilled in the art will appreciate that various modifications are possible without departing from the scope of the invention.

The disclosed embodiments should be considered to be exemplary rather than restrictive. The scope of the present invention is shown not in the above description but in the claims, and all differences within the range equivalent thereto will be understood to be incorporated in the present invention.

What is claimed is:

1. A film touch sensor, comprising:
a separation layer;
an electrode pattern part formed on the separation layer and including at least one electrode pattern and an insulating layer; and
a passivation layer formed of an inorganic material on the electrode pattern part,
wherein the passivation layer has a thickness selected from among a thickness ranging from 50 nm to 120 nm, a thickness ranging from 220 nm to 290 nm, and a thickness ranging from 360 nm to 420 nm, and
wherein the separation layer is provided in a manner such that it is formed on a carrier substrate and is then separated from the carrier substrate.

2. The film touch sensor of claim 1, wherein the inorganic material is SiO₂.

3. The film touch sensor of claim 1, further comprising a protective layer formed between the separation layer and the electrode pattern part.

4. The film touch sensor of claim 1, wherein the electrode pattern includes a first transparent electrode and a second transparent electrode, and the transparent electrodes are insulated from each other by the insulating layer.

5. The film touch sensor of claim 4, wherein the electrode pattern includes a first transparent electrode, a second transparent electrode, and a bridge electrode, and the transparent electrodes are insulated from each other by the insulating layer.

6. The film touch sensor of claim 1, wherein the insulating layer is an organic insulating layer.

7. The film touch sensor of claim 1, wherein the electrode pattern is formed of at least one material selected from among a metal, a metal nanowire, a metal oxide, carbon nanotubes, graphene, a conductive polymer, and conductive ink.

8. The film touch sensor of claim 7, wherein the metal oxide is selected from the group consisting of indium tin oxide (ITO), indium zinc oxide (IZO), indium zinc tin oxide (IZTO), aluminum zinc oxide (AZO), gallium zinc oxide (GZO), fluorine tin oxide (FTO), zinc oxide (ZnO), indium tin oxide-silver-indium tin oxide (ITO-Ag-ITO), indium zinc oxide-silver-indium zinc oxide (IZO-Ag-IZO), indium zinc tin oxide-silver-indium zinc tin oxide (IZTO-Ag-IZTO), and aluminum zinc oxide-silver-aluminum zinc oxide (AZO-Ag-AZO).

9. The film touch sensor of claim 1, further comprising a base film formed on the passivation layer.

10. The film touch sensor of claim 9, further comprising an adhesive layer formed between the passivation layer and the base film.

11. The film touch sensor of claim 9, wherein the base film is any one selected from among a polarizer plate, an isotropic film, a phase-difference film, and a protective film.

12. The film touch sensor of claim 1, wherein the carrier substrate is a glass substrate.

13. The film touch sensor of claim 1, wherein the separation layer is an organic polymer layer.

14. The film touch sensor of claim 13, wherein the organic polymer layer comprises at least one material selected from the group consisting of polyimide, polyvinyl alcohol, polyamic acid, polyamide, polyethylene, polystyrene, polynorbornene, a phenylmaleimide copolymer, polyazobenzene, polyphenylenephthalamide, polyester, polymethyl methacrylate, polyarylate, a cinnamate-based polymer, a coumarin-based polymer, a phthalimidine-based polymer, a chalcone-based polymer, and an aromatic acetylene-based polymer.

15. The film touch sensor of claim 1, wherein the separation layer has a thickness ranging from 10 to 1000 nm.

16. The film touch sensor of claim 1, wherein the separation layer has a thickness ranging from 50 to 500 nm.

* * * * *